(12) United States Patent
Vu et al.

(10) Patent No.: US 9,927,251 B2
(45) Date of Patent: Mar. 27, 2018

(54) METHOD AND APPARATUS FOR DETECTING AND CORRECTING FREEWAY-RAMP-FREEWAY SITUATION IN CALCULATED ROUTE

(75) Inventors: Tien Vu, Torrance, CA (US); Shinobu Doi, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 810 days.

(21) Appl. No.: 12/380,180

(22) Filed: Feb. 24, 2009

(65) Prior Publication Data

US 2010/0217512 A1    Aug. 26, 2010

(51) Int. Cl.
*G01C 21/00* (2006.01)
*G01C 21/34* (2006.01)
*G08G 1/0968* (2006.01)

(52) U.S. Cl.
CPC ... *G01C 21/3461* (2013.01); *G08G 1/096827* (2013.01)

(58) Field of Classification Search
CPC .................................. G08G 1/096827
USPC ................................. 701/201, 411
See application file for complete search history.

(56) References Cited

U.S. PATENT DOCUMENTS

| 7,031,983 | B2 * | 4/2006 | Israni et al. | 701/117 |
| 2004/0176907 | A1 * | 9/2004 | Nesbitt | 701/202 |
| 2005/0090976 | A1 * | 4/2005 | Beesley et al. | 701/209 |
| 2005/0203937 | A1 * | 9/2005 | Nomura | 707/102 |
| 2006/0004511 | A1 * | 1/2006 | Yoshikawa et al. | 701/200 |

FOREIGN PATENT DOCUMENTS

| JP | 11-14385 | 1/1999 |
| JP | 2005-172675 | 6/2005 |
| JP | 2006-153693 | 6/2006 |

* cited by examiner

*Primary Examiner* — A Hunter Wilder
(74) *Attorney, Agent, or Firm* — Muramatsu & Associates

(57) ABSTRACT

A method detects a particular freeway-ramp-freeway situation in a calculated route and corrects the route by replacing the freeway-ramp-freeway situation with all-freeway segments. The method includes the steps of: establishing a calculated route to a destination; examining the calculated route to detect whether there is a first point where the calculated route exits a freeway and a second point where the calculated route enters a freeway; evaluating map data to determine whether the freeway exited and the freeway entered are the same freeway; and replacing road segments of the calculated route between the first point and the second point constituting the freeway-ramp-freeway situation with freeway segments between the first point and the second point, thereby avoiding the freeway-ramp-freeway situation.

18 Claims, 15 Drawing Sheets

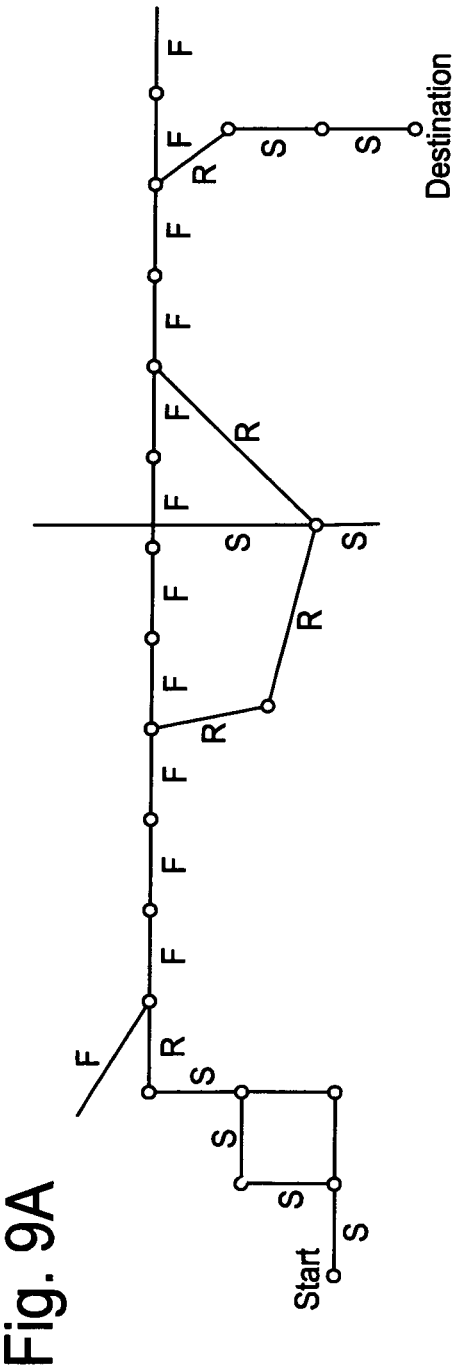
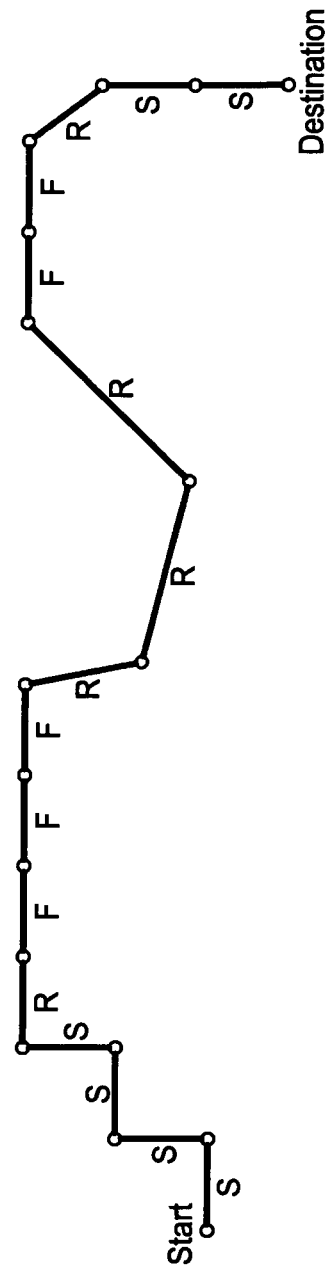
Fig. 9A
Fig. 9B

US 9,927,251 B2

METHOD AND APPARATUS FOR DETECTING AND CORRECTING FREEWAY-RAMP-FREEWAY SITUATION IN CALCULATED ROUTE

FIELD OF THE INVENTION

This invention relates generally to a method and apparatus for detecting and correcting a route for a navigation system, and more particularly, to a method and apparatus for detecting a freeway-ramp-freeway situation in a calculated route to a destination and correcting the calculated route by replacing the freeway-ramp-freeway situation with all-freeway segments.

BACKGROUND OF THE INVENTION

A navigation system performs travel guidance for enabling a user to easily and quickly reach the selected destination. A typical example is a vehicle navigation system where a navigation function of the vehicle guides a driver to a destination through a calculated route. Such a navigation system detects the position of the vehicle, and reads out map data pertaining to an area at the current vehicle position from a data storage medium such as a DVD (digital versatile disc). Typically, the navigation system displays a map image on a screen while superimposing thereon a mark representing the current vehicle position.

When a start point and a destination are specified, the navigation system operates such algorithms as an A* search algorithm and its variants to calculate a route between the start point and the destination. In establishing a route to the destination by such an algorithm, in some cases, the navigation system may produce a calculated route that involves a freeway-ramp-freeway situation. Here, a freeway-ramp-freeway situation refers to the condition where the route is initially on a freeway, then exits the freeway, and immediately re-enters the same freeway.

An example of such a freeway-ramp-freeway situation is shown in the schematic diagram of FIG. 1 which shows a case where a freeway is excessively curved. In this situation, the navigation system may establish a calculated route that exits at an exit ramp 11 and enters the same freeway 9 at an entry ramp 13. This is because, taking off the freeway 9 to reenter the same freeway after the curve can be effective in reducing an overall cost, i.e., a driving distance and a time, since the freeway 9 is curved significantly.

Although the overall distance may become shorter, there are other considerations that may not favor the use of the freeway-ramp-freeway situation shown in FIG. 1 on the calculated route. One consideration is a driving speed that may be reduced by exiting the freeway to take a normal (surface) street, which may destroy the purpose of using the freeway-ramp-freeway situation. Another consideration is maneuverability that is affected by the required maneuver to exit and reenter the freeway.

More importantly, driving a vehicle via the freeway-ramp-freeway situation may violate local traffic regulations. Therefore, in some cases, such a calculated route that includes the freeway-ramp-freeway situation described above may not be desirable. Thus, there is a need of a new method and apparatus for calculating a route and detecting a freeway-ramp-freeway situation in the calculated route and correcting the freeway-ramp-freeway situation, thereby establishing an optimum guidance route to the destination in view of the considerations noted above.

SUMMARY OF THE INVENTION

It is, therefore, an object of the present invention to provide a method and apparatus for a navigation system which is capable of detecting a freeway-ramp-freeway situation in a calculated route and correcting the freeway-ramp-freeway situation if necessary.

It is another object of the present invention to provide a method and apparatus for a navigation system which is capable of determining if there is a freeway-ramp-freeway sequence and replace the freeway-ramp-freeway sequence with an all-freeway sequence to remove the freeway-ramp-freeway situation from the calculated route.

It is a further object of the present invention to provide a method and apparatus for a navigation system which is capable of detecting a freeway-ramp-freeway situation created in the calculated route through a normal route guidance mode or a dynamic route guidance-mode and changing the freeway-ramp-freeway situation to the all freeway sequence based on evaluation of costs.

One aspect of the present invention is a method of correcting a freeway-ramp-freeway situation in a calculated route between a start point to a destination for a navigation system. The method includes the steps of: establishing a calculated route between the start point and the destination where the calculated route includes a freeway; examining the calculated route from one end to another end (forward direction) to detect whether there is a first point where the calculated route exits a freeway; further examining the calculated route in the forward direction to detect whether there is a second point where the calculated route enters a freeway; evaluating map data associated with the calculated route to determine whether the freeway exited at the first point and the freeway entered at the second point are the same freeway; determining that a freeway-ramp-freeway situation exists in the calculated route when the freeway exited and the freeway entered are the same where the freeway-ramp-freeway situation is defined as a situation where a calculated route exits a freeway and immediately enters the same; and replacing road segments of the calculated route between the first point and the second point constituting the freeway-ramp-freeway situation with freeway segments between the first point and the second point, thereby changing the freeway-ramp-freeway situation to an all-freeway situation.

In the method of the present invention, after conducting the step of establishing the calculated route, the method further includes a step of changing the calculated route by dynamically evaluating a cost of the calculated route based on factors including current or estimated traffic conditions on the calculated route. In the present invention, the step of examining the calculated route to detect the second point is conducted within a predetermined distance from the first point on the calculated route.

In the present invention, the step of evaluating the map data to determine whether the freeway exited at the first point and the freeway entered at the second point are the same is conducted by comparing link IDs of the first point and the second point while taking map mesh IDs into consideration when the first point and the second point belong to different map meshes from one another. Further, the step of evaluating the map data to determine whether the freeway exited at the first point and the freeway entered at the second point are the same is conducted by comparing link IDs of the first point and the second point at the same or higher map layer level when the first point and the second point belong to different map meshes from one another.

In the present invention, before conducting the step of replacing the road segments of the calculated route, the method further includes a step of comparing a first cost associated with the freeway-ramp-freeway situation with a second cost associated with the all-freeway situation and proceeding to the step of replacing the road segments unless the second cost is excessively higher than the first cost where the cost is determined based on factors including a distance and a time length.

In the present invention, before conducting the step of replacing the road segments of the calculated route, the method further comprising a step of examining a traffic regulation governing a location of the freeway-ramp-freeway situation and immediately proceeding to the step of replacing the road segments when the traffic regulation prohibits the freeway-ramp-freeway situation.

In the present invention, after conducting the step of determining that the freeway-ramp-freeway situation exists, the method further includes a step of evaluating the map data to find a freeway segment that is connected to the first point and is oriented in the forward direction.

In the present invention, after conducting the step of finding the freeway segment that is connected to the first point, the method further includes a step of evaluating the map data to find a freeway segment on the calculated route within a predetermined distance from the first point, and a step of evaluating the map data to find a freeway segment that is incoming to the second point.

In the present invention, after conducting the step of finding the freeway segment that is incoming to the second point, the method further comprising a step of retrieving all of freeway segments between the first point and the second point so that the retrieved freeway segments replace the road segments constituting the freeway-ramp-freeway situation.

Another aspect of the present invention is an apparatus for detecting and correcting a freeway-ramp-freeway situation in the calculated route for a navigation system. The apparatus traverses the calculated route established when the destination is specified to detect whether there is the freeway-ramp-freeway situation in the calculated route. When the freeway-ramp-freeway situation exists, the apparatus checks availability of an all-freeway sequence and retrieves the freeway segments of the all-freeway sequence to replace them with the freeway-ramp-freeway situation by implementing the various steps defined in the method invention noted above.

According to the present invention, the method and apparatus enables a navigation system to detect and correct the freeway-ramp-freeway situation in the calculated route. The method and apparatus traverses the calculated route to detect whether there is a freeway-ramp-freeway situation in the calculated route by finding an exit node and an entry node on the calculated route for the same freeway. When the freeway-ramp-freeway situation exists, the method and apparatus checks availability of an all-freeway sequence and retrieves the freeway segments for the all-freeway sequence to replace them with the freeway-ramp-freeway situation. The present invention corrects the calculated route established either for a normal route guidance mode or a dynamic route guidance mode. Accordingly, the present invention is able to remove the freeway-ramp-freeway situation that requires hardship in driving or violates the local traffic regulations from the calculated route.

BRIEF DESCRIPTION OF THE DRAWINGS

FIGS. 9A and 9B are schematic diagrams showing an example of road map representation to describe an example of procedure for determining an optimum route in the present invention involving the freeway-ramp-freeway situation.

DETAILED DESCRIPTION OF THE PREFERRED EMBODIMENT

The method and apparatus for detection and correction of the freeway-ramp-freeway situation in the calculated route is described in detail with reference to the accompanying drawings. The method and apparatus of the present invention is designed to detect a particular freeway-ramp-freeway situation in the calculated route to the destination and correct the calculated route. The method and apparatus of the present invention determines if there is a freeway-ramp-freeway sequence and replace the freeway-ramp-freeway sequence with an all-freeway sequence to remove the freeway-ramp-freeway situation from the calculated route.

It should be noted that although an embodiment of the present invention is described mainly with respect to a vehicle navigation system, the concept of the present invention can be applied to other navigation system such as a portable navigation device, a personal computer or an electronics device with a navigation function, etc.

As a user sets a destination, the navigation system will calculate a route from the origin (start point) to the destination (end point). When performing the route calculation, each link that is connected to the current expansion node is examined with respect to the cost of the link. The link cost is determined by taking such factors as a distance, a time length, a class of road, speed limits, traffic regulations, etc. into consideration. The link cost may not always be static but may be variable dynamically depending upon current or estimated traffic conditions, etc., which will be incorporated in the calculated route in a dynamic route guidance (DRG) mode.

Namely, in the dynamic route guidance (DRG), the link cost can be changed dynamically based upon current road conditions such as a degree of seriousness of traffic congestion, traffic accident, construction, lane closure, etc. When heavy traffic congestion is found on a particular link, for example, the cost associated with that link is increased. Thus, in the dynamic route guidance mode, the navigation system will perform route calculation from one point to another point by dynamically detecting the lowest cost route incorporating the current or estimated traffic conditions on the calculated route.

During a normal route calculation (non-DRG) process, freeway (including highway and express way) links are assigned to the highest road class and consequently their costs are generally the lowest. When the quickest route is to be calculated, the freeway links are typically selected as much as possible so long as they are available on the route between the start point and the destination. Thus, in the normal route calculation process, the current traffic condition such as a traffic accident, traffic congestion, etc. on the links is not taken into consideration.

Figure 2:
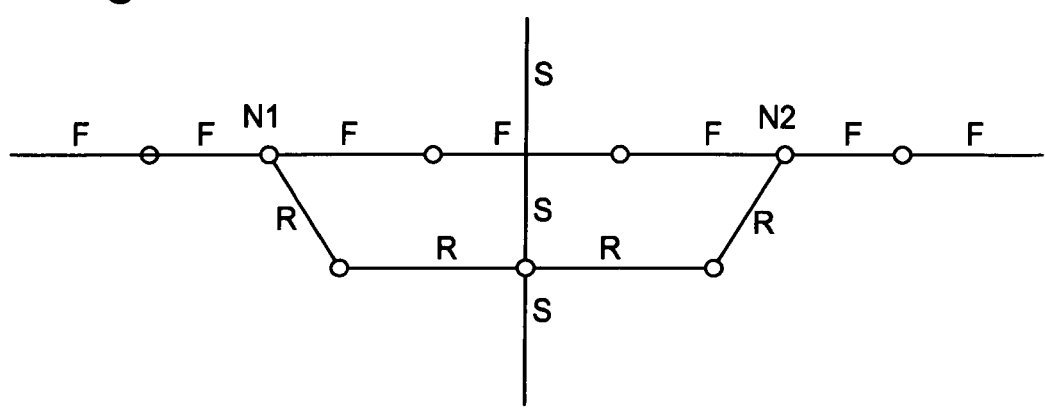
FIG. 2 is a schematic diagram showing an example of map data representing a freeway, a surface road, ramps for leaving or approaching the freeway, and street segments connected by nodes.

FIG. 2 is a schematic diagram showing an example of map data representing a freeway, a surface road, freeway ramps for exit and entry of freeway, and nodes which connect street segments (links) of the freeway, surface roads and ramps. Here, a freeway is represented by a letter "F", a surface street is represented by a letter "S", and a freeway ramp is represented by a letter "R", each being configured by a plurality of road segments (links) that are linked by the nodes each being represented by a circle mark and a letter "N". As shown, in this example, the freeway F has a freeway ramp R that allows a vehicle to exit the freeway F at a node N1 or to enter the freeway F at a node N2.

Typically, an optimum route is established through route calculation by the navigation system that assigns the lower cost to a freeway. However, there arises a situation where the calculated route which uses the freeway continuously (i.e., to stay on the freeway) becomes higher in the cost than the cost of taking a freeway and exiting the freeway and then returning to the same freeway (freeway-ramp-freeway situation). In the dynamic route guidance mode, as noted above, the link cost can be changed dynamically based upon current traffic conditions such as a degree of seriousness of traffic congestion, traffic accident, etc.

Figure 3:
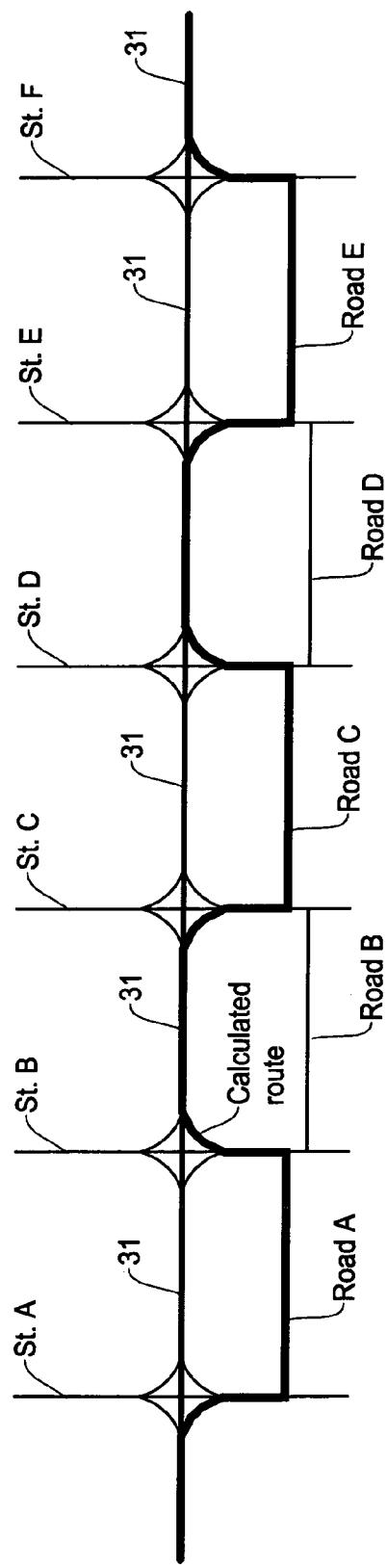
FIG. 3 is a schematic diagram showing an example of calculated route on the map image where a freeway crosses surface roads at a plurality of locations each having the freeway-ramp-freeway situation.

Thus, in an extreme case, a navigation system may establish a calculated route that has the freeway-ramp-freeway situation as illustrated in FIG. 3 where the route repeatedly exits and enters the same freeway. In this example, a freeway 31 runs horizontally, a plurality of surface streets A-F intersect with the freeway 31, a plurality of roads A-E that run in parallel with the freeway 31, and many freeway ramps allow a vehicle to exit or enter the freeway 31. In FIG. 3, a thick solid line represents the calculated route produced by the navigation system which repeatedly exits and enters the freeway 31.

This situation can arise when a traffic accident or traffic congestion, etc. is detected on a part of the freeway 31 that dramatically increases the cost of using the corresponding parts of the freeway 31. As noted above, in the dynamic route guidance (DRG), in addition to the distance, road class, etc., the link cost is evaluated by incorporating the degrees of seriousness of traffic congestion, traffic accident, etc. In such a situation, a calculated route (route solution) that exits the freeway 31 to avoid such a traffic incident and reenters the same freeway 31 after the traffic incident can be established as a result of route calculation because such a guidance route is considered more cost effective than a route that is staying on the freeway 31.

Figure 1:
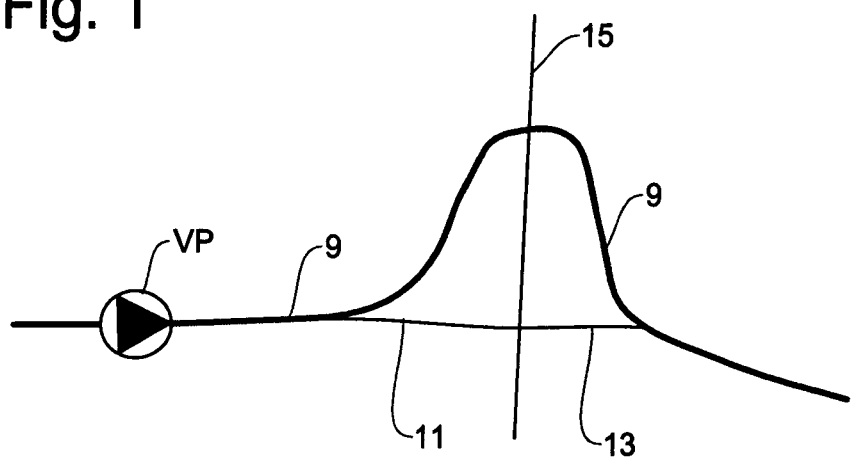
FIG. 1 is a schematic map view showing a situation where a freeway is excessively curved and the navigation system would establish a calculated route that exits from the freeway and then immediately enters the same freeway.

However, taking off the freeway and reentering the same freeway requires many turning maneuvers that are generally not desirable to the driver. The driver will have to change the lane and make two or more turns, which makes the route more complicated and the driving more stressful and prone to a traffic accident, etc. Further, driving a vehicle in such a way to exit the freeway and to immediately enter the same free way as in the situation of FIG. 1 may violate the local traffic regulations.

Thus, when a freeway-ramp-freeway situation is included in a calculated route, the present invention detects such a condition and, if necessary, corrects the calculated route to remove the freeway-ramp-freeway situation from the calculated route. Firstly, after an initial calculated route to the destination is established, the navigation system checks whether the freeway-ramp-freeway situation is included in the calculated route. Secondly, if the freeway-ramp-freeway situation is found in the calculated route, the navigation system determines whether the freeway-ramp-freeway situation is to be kept intact or to be corrected so that the calculated route stays on the freeway.

An example of basic procedure of the present invention for determining whether there is a freeway-ramp-freeway situation in the calculated route is described with reference to the flow chart in FIG. 4. In order to detect the freeway-ramp-freeway situation in the calculated route, the navigation system checks the map data (road segments and nodes) of the calculated route starting from the beginning to detect a freeway-to-ramp transition in the step 101. For example, in this step, the navigation system carefully checks (traverses) the calculated route to find out whether there is a point that exits the freeway link even though the freeway link is expandable forward.

Then, the list of map data associated with the calculated route is further shifted for a limited distance to find whether there is a ramp-to-freeway transition in the calculated route in the step 103. Namely, the navigation system checks whether the route enters a freeway in this step. There are two possibilities, one is that the vehicle is guided to exit a freeway and then to enter another freeway, i.e., a different freeway, and the second is to detect the route that the vehicle exits and immediately enters the same freeway. As noted above, within the context of the present invention, the latter one represents the freeway-ramp-freeway situation to be detected and corrected, thereby being removed from the calculated route.

In the step 104, the navigation system will check if the exited freeway and re-entered freeway is actually the same freeway. In order to determine that it is the same freeway, link IDs of the freeways are compared to see if the link IDs match with one another. Thus, in the flow chart of FIG. 4, the navigation system determines that the freeway-ramp-freeway situation exists when it is judged that the exited freeway and the reentered freeway are one and the same freeway in the step 104.

However, in the map data currently available for navigation systems, the link ID of the same freeway may be different between the exit point link (exit node) and the reentry point link (entry node) in certain situations. For example, such a problem arises when the exit node belongs to one map mesh and the entry node belongs to another map mesh (different mesh problem), which will be described with reference to FIG. 5. Another problem arises when there is a junction between the exit node and the entry node (intervening junction problem) of the freeway, which will be described with reference to FIG. 7.

Figure 5:
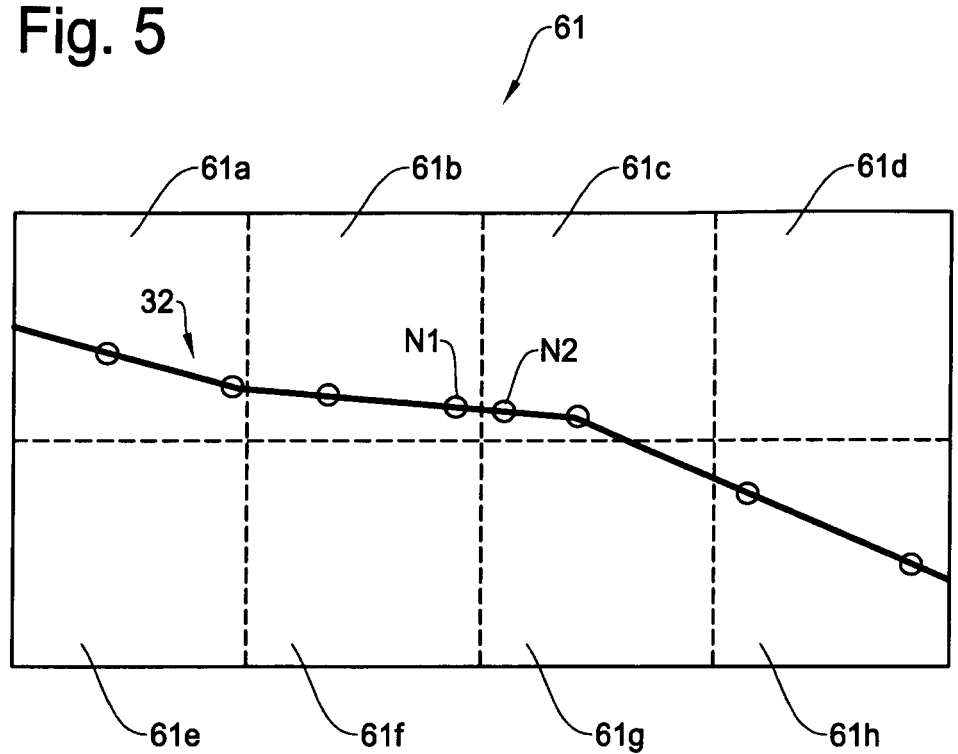
FIG. 5 is a schematic diagram showing an example of problems associated with a mesh structure employed in the map data for comparing two or more road segments.

The different mesh problem noted above concerning the inconsistency of the link IDs is illustrated in the schematic diagram of FIG. 5. Typically, in the map data for a navigation system, the data corresponding to a certain size of area is divided into a plurality of smaller rectangular areas, each of which is called a map mesh. In the example of FIG. 5, an area 61 of the map data is divided into map meshes 61*a* to 61*h* so that the navigation system is able to process the map data as a unit of map mesh.

Here, it is assumed that a freeway 32 runs across the map meshes 61*a*, 61*b*, 61*c*, 61*g* and 61*h* where an exit node N1 of the freeway 32 belongs to the map mesh 61*b* and an entry node N2 of the freeway 32 belongs to the map mesh 61*c*. As the map data are organized by each mesh as a unit, a link ID of the exit node N1 and a link ID of the entry node N2 for the same freeway 32 may differ in the map data available for navigation systems today. Thus, in such a situation, whether the exited freeway and re-entered freeway is actually the same freeway cannot be determined accurately by simply comparing the link IDs.

The different mesh problem can be solved by looking at not only the link IDs but also the mesh ID at the same map level to see whether the two map meshes, such as the map meshes 61*b* and 61*c*, are adjoining each other. Another method of checking whether the exited freeway and reentered freeway are the same freeway in the above situation is to check the road (freeway) names in the different map meshes to see whether the two link IDs are associated with the same freeway. Another method of reducing the different mesh problem described with reference to FIG. 5 is to actively use an operation of map level promotion.

Figure 6:
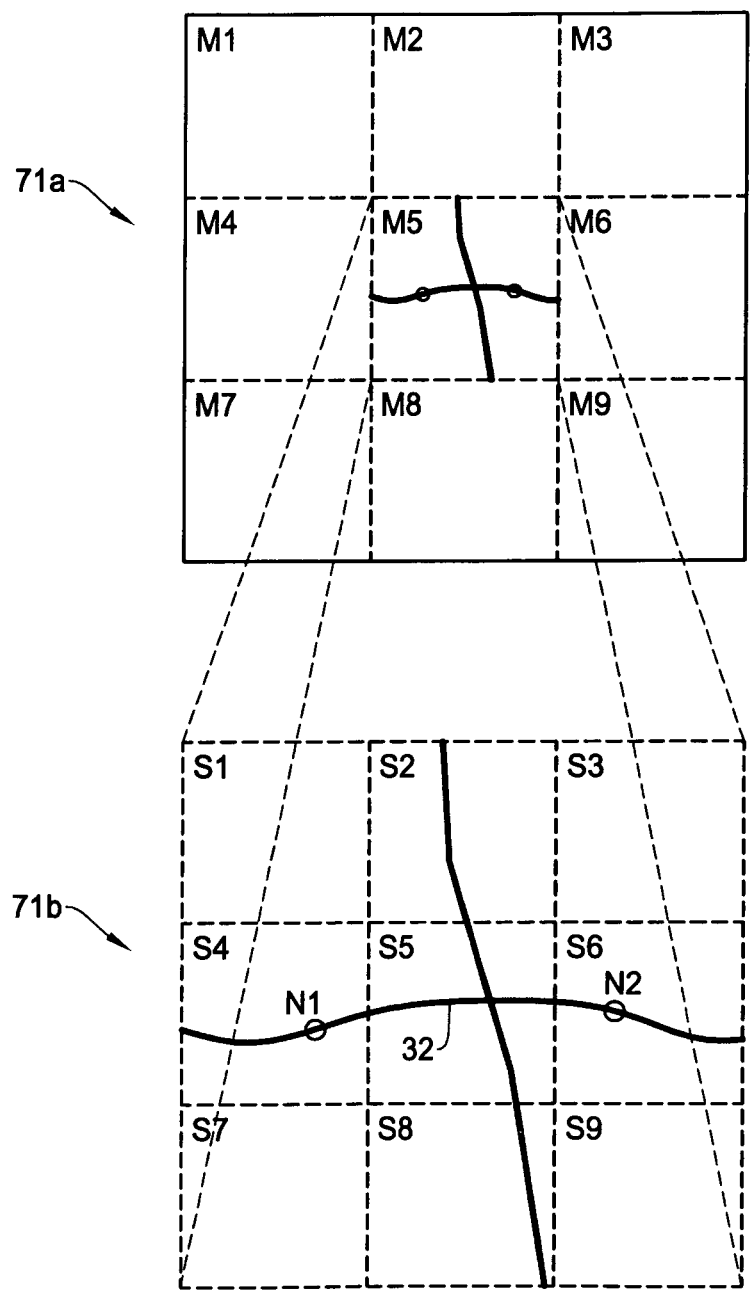
FIG. 6 is a schematic diagram showing an example of map data levels and map level changes for improving the accuracy when comparing two or more road segments involving the freeway-ramp-freeway situation.

As shown in FIG. 6, in addition to the mesh structure noted above, the map data used for navigation systems is also structured in a layered form. Namely, the map data is hierarchically layered corresponding to the level of details of the map information as well as it is divided into the meshes noted above corresponding to the size or amount of the map data. In the layered structure of the map data, the higher the level, the lower the detailedness of the map information and the larger the covering area.

Typically, the higher level map data represent only high class roads, for example, interstate highway, freeway, etc. while the lower level map data represent low class roads, i.e., residential roads, etc., POI icons, building foot prints, etc., in addition to that represented by the higher layers. One of the reasons for using the layered structure is to accommodate several different map scales for enlarging or shrinking the map image on the display screen on the navigation system. Since the lower level includes more detailed map information, the size of the map mesh (covering area) is smaller than that of the higher level to maintain the amount of map data to be processed by the navigation system within a predetermined range.

In the example of FIG. 6, an upper level 71*a* has map meshes M1 to M9 and a lower level 71*b* has map meshes S1 to S9 where one mesh (ex. M5) in the upper level 71*a* covers the area of all the map meshes S1 to S9 in the lower level 71*b*. The map level promotion means a shift from a lower level of the map data that covers a small area to a higher level of the map data that covers a larger area. Thus, in the map level promotion, the navigation system promotes a lower level to an upper level since an exit node and an entry node may likely exist within one map mesh of the higher level.

In FIG. 6, the street shown on the lower layer 71*b* is divided by the meshes, which creates the different mesh problem noted above. For example, the freeway 32 that runs horizontally crosses the map mesh between mesh S4 and S5, as well as S5 and S6 where, similar to the situation of FIG. 5, the exit node N1 and the entry node N2 belong to the map meshes different from one another. Since the map mesh M5 in the upper level 71*a* covers all of the area that is covered by the lower level 71*b*, by climbing to the upper level 71*a* (map level promotion), it is known that the exit node N1 and the entry node N2 belong to the same map mesh.

As a result, the map level promotion significantly reduces the frequency of encountering the mesh boundaries in examining the route. For example, if the mesh boundary in the lower level occurs every 1.5 miles whereas the mesh boundaries in the highest level occur every 500 miles, the likelihood of encountering the mesh boundary in the higher level will be much smaller. Moreover, because each link in the higher level represents a plurality of lower level links for a given route, the cost of travelling can be minimized when performed at the higher level. Thus, a size of the memory necessary for such processing and a time required for searching the links can be significantly reduced.

Figure 7A:
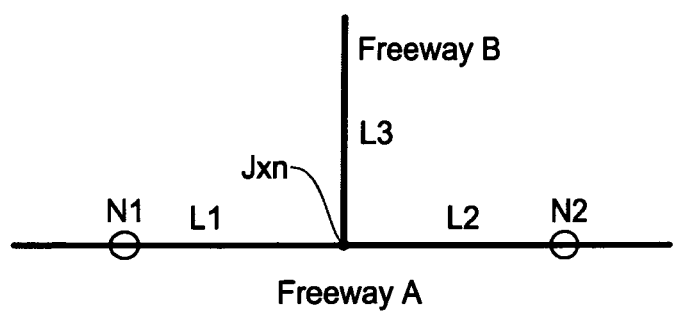
FIGS. 7A and 7B are schematic diagrams showing a problem for comparing two or more road segments which arises when there is a junction between the exit point and the entry point of a freeway.
Figure 7B:
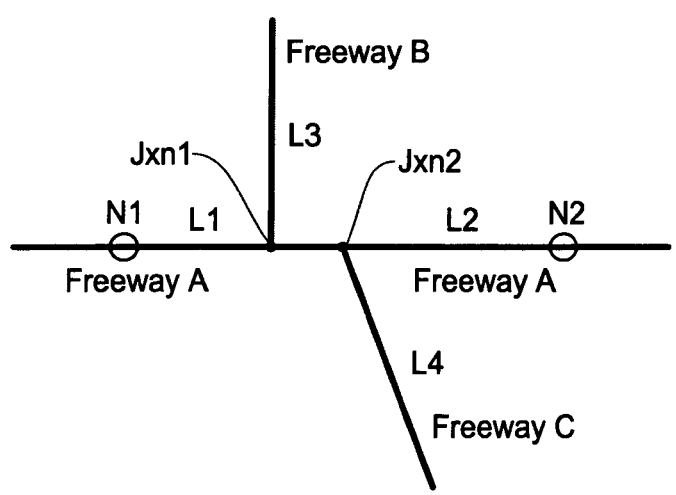

The intervening junction problem noted above that arises when there is a junction between the exit node and the entry node of the freeway is described with reference to schematic diagrams of FIGS. 7A and 7B. In the example of FIG. 7A, a freeway A has a junction Jxn to another freeway B where the junction Jxn is located between the exit node N1 and the entry node N2 of the freeway A. In the example of FIG. 7B, a freeway A has junctions Jxn1 and Jxn2 to other freeways B and C, respectively, where the junctions Jxn1 and Jxn2 are located between the exit node N1 and the entry node N2 of the freeway A.

In the map data currently available for navigation systems, a link ID of a link L1 and a link ID of a link L2 may be different even though they are a part of the same freeway A if such junctions are located between the exit node N1 and the entry node N2. Thus, in such a situation, whether the exited freeway and the entered freeway are actually the same freeway cannot be determined accurately by simply comparing the link IDs. One of the ways to solve this problem is to examine the freeway name and identify that both of the links L1 and L2 are a part of the freeway A.

As noted above, the link ID and the mesh ID on the same map level should be checked to overcome the different mesh problem. The link ID and the mesh ID of the exit node N1 and the link ID and the mesh ID of the entry node N2 must be compared to check whether the exit node N1 and the entry node N2 are on the same freeway. Since the link IDs and the mesh IDs change between different map levels, it is necessary to compare these data on the same map level.

Having detected the freeway-ramp-freeway situation in the calculated route as described in the foregoing, the navigation system will check whether the freeway-ramp-freeway segments can be replaced with freeway-only segments. The navigation system checks the calculated route by starting back from the freeway exit-ramp node and advancing the freeway segments further until a freeway entry-ramp node is met on the same freeway. If all links of the freeway (all-freeway segments) are found and such freeway links do not contain an incident that makes traveling the freeway overly costly, the freeway-ramp-freeway segments are replaced with the all-freeway segments.

Figure 8A:
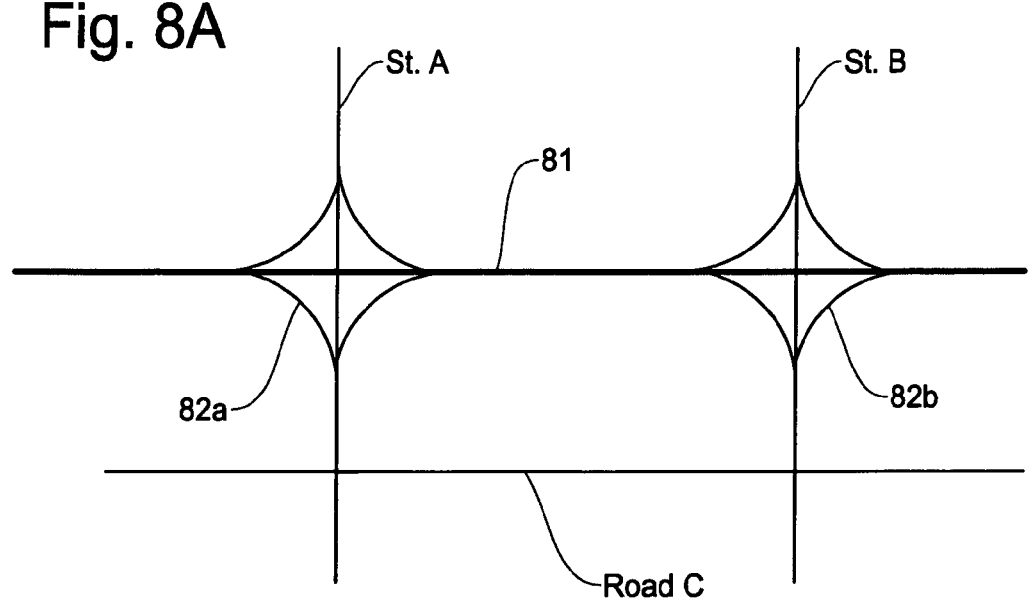
FIGS. 8A-8D are schematic diagrams showing map images that have a freeway, normal streets, a freeway exit ramp, and a freeway entry ramp to illustrate the basic operation for detecting and correcting the freeway-ramp-freeway situation in accordance with the present invention.
Figure 8B:
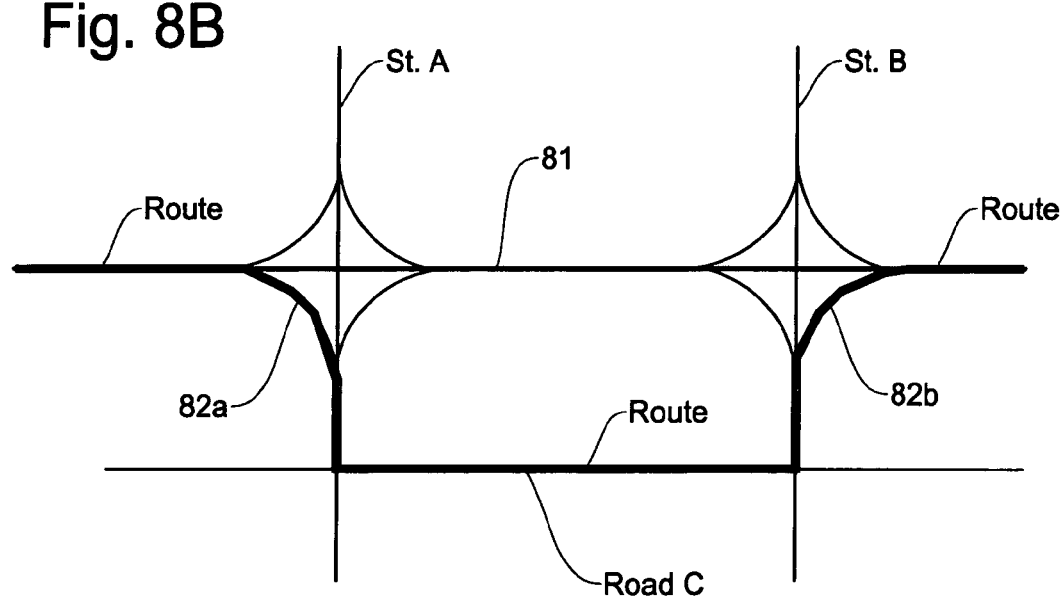

The basic steps of correcting the freeway-ramp-freeway situation in the present invention are described with reference to FIGS. 8A-8D. Schematic diagrams of FIGS. 8A-8D show map images that have a freeway 81, normal (surface) streets A and B that cross the freeway 81, a freeway exit ramp 82a and a freeway entry ramp 82b, and a road C that runs in parallel with the freeway 81. FIG. 8A shows a situation where no calculated route is established while FIG. 8B shows a situation where the navigation system has calculated a route as indicated by a thick line.

In this example of FIG. 8B, the calculated route that has been initially established (original route solution) exits the freeway 81 at the freeway exit ramp 82a to use the street A, road C and street B, and then returns to the freeway 81 by taking the freeway entry ramp 82b. As noted above, this freeway-ramp-freeway situation is detected in the procedure described above by checking the link IDs, mesh IDs, conducting the map level promotion, etc. As the freeway-ramp-freeway situation has been detected from the calculated route, the navigation system will examine the calculated route to find another route that does not involve the freeway-ramp-freeway situation.

Figure 8C:
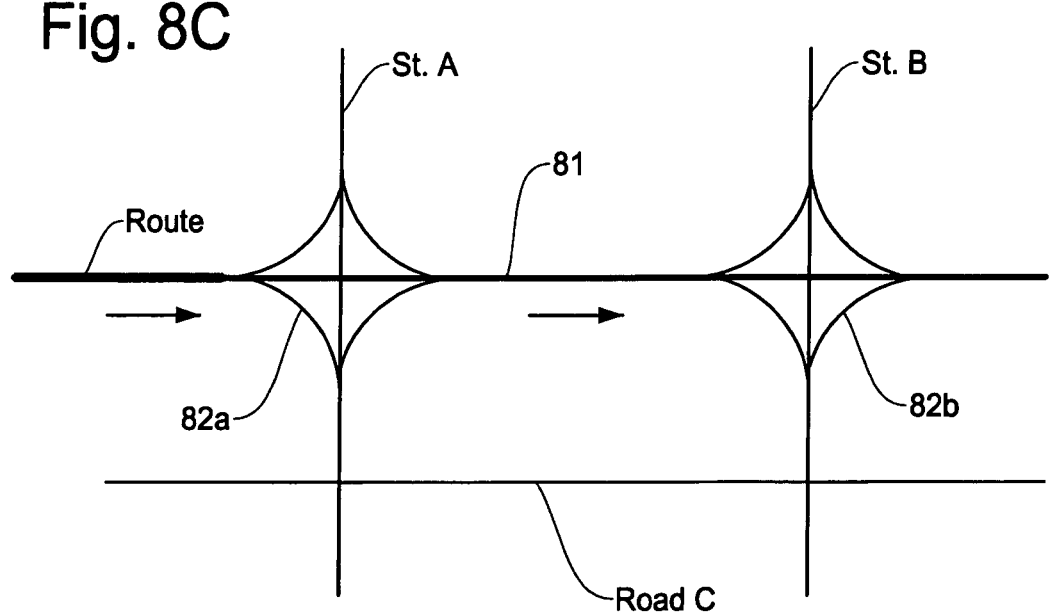
Figure 8D:
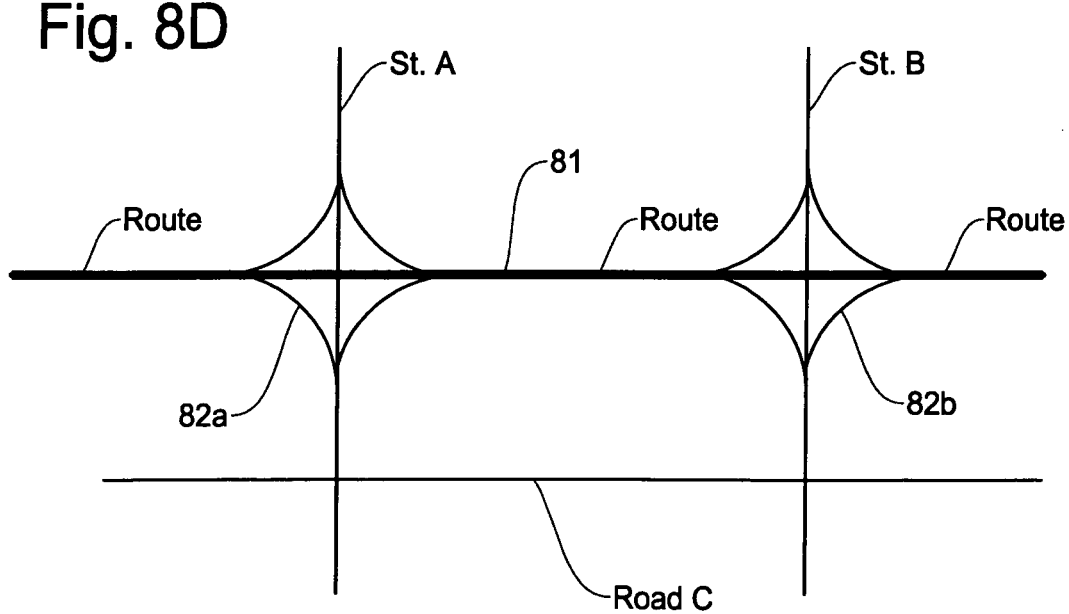

Thus, in the example shown in FIG. 8C, the navigation system follows the calculated route to check the possibility of staying on the same freeway. As the navigation system proceeds the freeway 81 and encounters the freeway exit ramp 82a on the calculated route, the navigation system will check the map data whether the route can stay on the freeway 81 rather than taking the exit ramp 82a. By further following the freeway 81, the navigation system will next encounter the freeway entry ramp 82b on the same freeway 81.

Thus, at this point, the navigation system determines that there is an alternative route, i.e., a freeway-only route, that can be replaced with the freeway-ramp-freeway situation. Accordingly, unless there is a significant cost increase (ex. traffic accident, construction, etc.), the original calculated route involving the freeway-ramp-freeway situation shown in FIG. 8B can be corrected as a freeway-only route shown in FIG. 8D. For doing this, the navigation system will compare those two routes (as between the original freeway-ramp-freeway route and the newly found freeway-only route) to determine the better route.

In the procedure of comparing the routes, a plurality of criteria may be used to determine which route is to be finally selected. Among others, the navigation system evaluates the costs of taking off and reentering the freeway as well as such factors as distances, travel times, current or estimated traffic conditions, road structures, traffic regulations, etc. Finally, if the navigation system determines that freeway-only route is more desirable, the portion of the calculated route corresponding to the original freeway-ramp-freeway situation is replaced with the freeway-only route.

FIGS. 9A and 9B are schematic diagrams showing an example of road map representation for describing an example of procedure for determining an optimum route in the present invention involving the freeway-ramp-freeway situation. In FIGS. 9A and 9B, each road segment (link) is represented by a letter describing the type of road where a letter "S" indicates a surface street, a letter "R" indicates a freeway (exit or entry) ramp, and a letter "F" indicates a freeway. Each road segment is connected with other road segments by nodes represented by circles.

FIG. 9A shows the schematic road map (map data) associated with the freeway and exit and entry ramps to establish a calculated route between a start point and a destination. FIG. 9B shows the schematic road map of the calculated route having the freeway-ramp-freeway situation established from the road map of FIG. 9A. The calculated route of FIG. 9B can be an optimum route if the overall cost involving the freeway-ramp-freeway situation is lower than the freeway-only route and if the freeway-ramp-freeway situation does not violate the traffic regulations.

With reference to flow charts of FIGS. 10 and 12 and schematic diagrams of FIGS. 11A-11E and 13A-13C, examples of operation for detecting and correcting the freeway-ramp-freeway under the present invention will be described in more detail. The flow chart of FIG. 10 and the schematic diagrams of FIGS. 11A-11E are directed to the situation where the dynamic route guidance (DRG) is not used. The flow chart of FIG. 12 and the schematic diagrams of FIGS. 13A-13D are directed to the situation where the dynamic route guidance (DRG) is used.

First, the situation where the dynamic route guidance (DRG) is not used is described with reference to the flow chart of FIG. 10 and the schematic diagrams of FIG. 11A-11E. In this non-DRG situation, once the calculated route (route solution) is accepted, the route will not be changed by reflecting the current traffic conditions, etc. Similar to the schematic road map shown in FIGS. 9A and 9B, in FIGS. 11A-11E, a letter "S" indicates a surface street, a letter "R" indicates a freeway (exit or entry) ramp, and a letter "F" indicates a freeway. Each road segment is connected with other road segments by nodes represented by circles and the road segments are represented by straight lines for simplicity of illustration.

Figure 10:
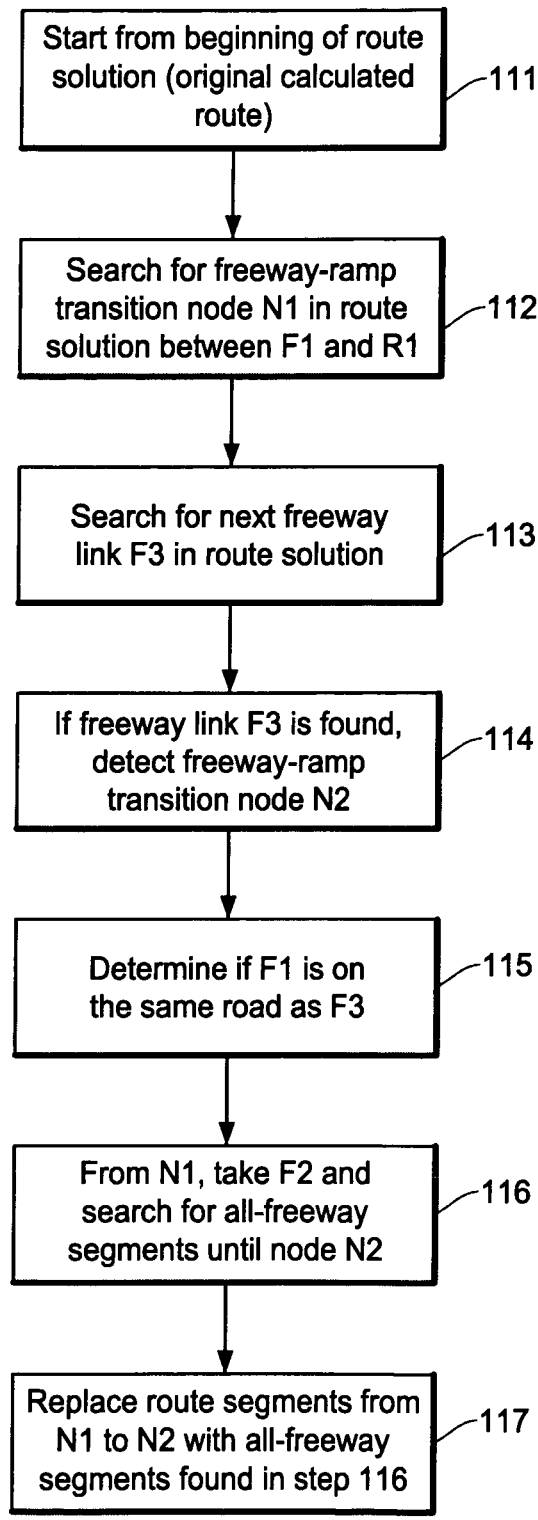
FIG. 10 is a flow chart showing an example of procedure for detecting the freeway-ramp-freeway situation in the calculated route and correcting the route in a non-DRG case under the present invention.
Figure 11A:
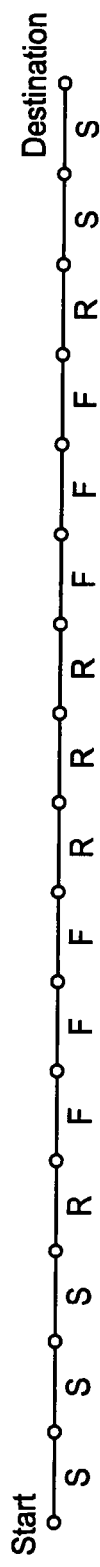
FIGS. 11A-11E are schematic diagrams showing an example of map image involved in the procedure corresponding to that of FIG. 10 for detecting the freeway-ramp-freeway situation in the calculated route and correcting the route in the non-DRG case under the present invention.

FIG. 11A is a schematic map view showing an originally calculated route (route solution) derived from the navigation system when the start point and the destination point are specified. The process shown by the flow chart of FIG. 10 is to detect the freeway-ramp-freeway situation in the calculated route and remove the freeway-ramp-freeway situation if necessary. In the flow chart of FIG. 10, with respect to the calculated route, the navigation system starts a detection process in the step 111 from the beginning of the route solution as shown in FIG. 11B.

Figure 11B:
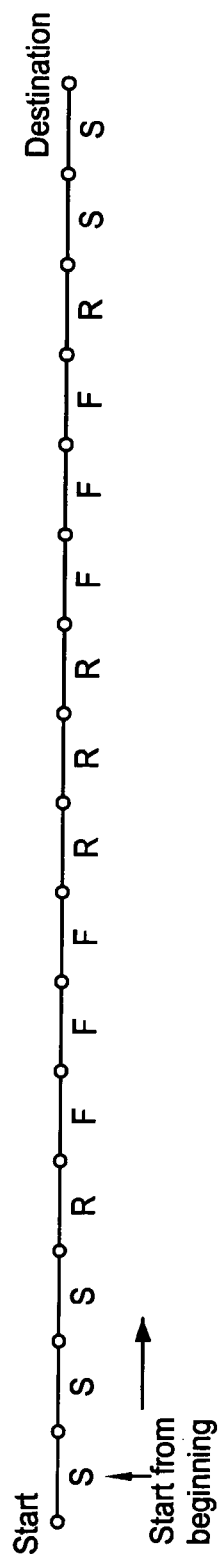
Figure 11C:
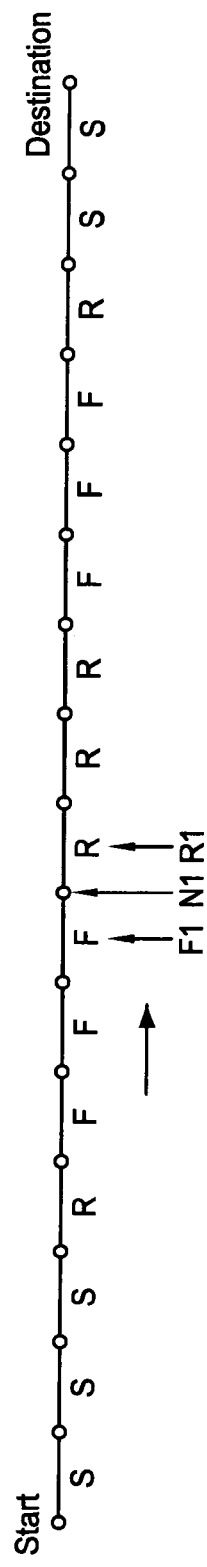

In the next step 112, the navigation system checks (traverses) the calculated route with respect to each road segment from the start point to the destination (forward direction) as shown by an arrow in FIG. 11B. As traversing the calculated route, the navigation system finds a freeway-ramp transition node (exit node) N1 between a freeway segment F1 and a freeway ramp segment R1. When the freeway-ramp transition node (exit node) N1 is found as shown in FIG. 11C, it means that the calculated route includes a condition where the route separates from the freeway.

Figure 11D:
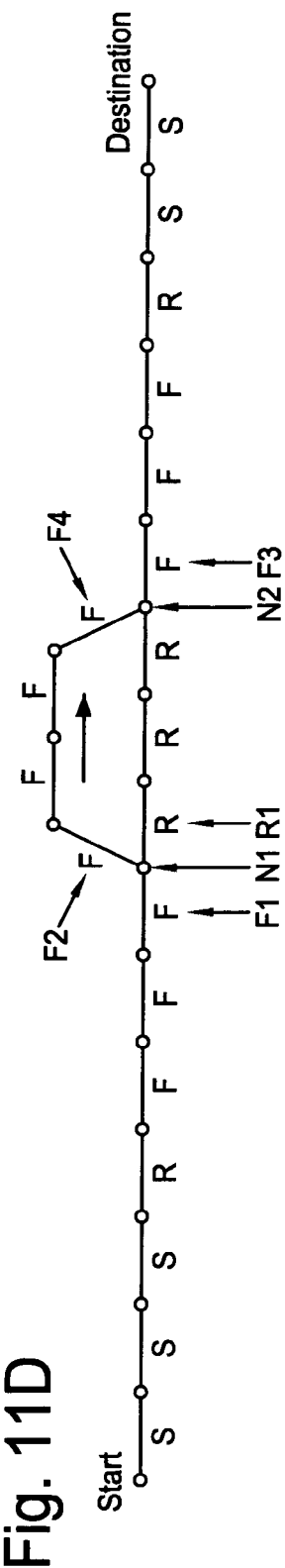

Here, the navigation system checks the map data, and if the exit node N1 is connected to a freeway segment F2 that is oriented in a forward direction as shown in FIG. 11D, the process moves to the next step 113. However, if the exit node N1 does not have a forward freeway segment F2, it means that the freeway is discontinued because it is the end point of the freeway or other reason. If there is no forward going freeway from the exit node N1, it is not possible to change the freeway-ramp-freeway segment to an all-freeway segment, thus, the process ends.

In the step 113, starting from the exit node N1, the navigation system searches the next freeway segments F on the calculated route for a predetermined distance D1. As shown in FIG. 11D, such a freeway segment F3 is found after three ramp segments R, which means that the calculated route enters the freeway again. The predetermined distance D1 for searching the next freeway segment F3 may be set arbitrary, for example, between 0.5 miles to 1.5 miles.

If the freeway segment F3 is found in this manner, in the step 114, the navigation system detects a freeway-ramp transition node N2 that is connected to the freeway segment F3. The freeway-ramp transition node N2 is an entry point (entry node) of the calculated route to the freeway. If the entry node N2 has an incoming freeway segment F4 as shown in FIG. 11D, then the navigation system proceeds to the next step 115. However, if the node N2 does not have an incoming freeway segment F4, it means that the freeway is newly started here. Since there is no incoming freeway segment to the entry node N2, it is not possible to change the freeway-ramp-freeway segment to an all-freeway segment, thus, the process ends.

In the step 115, the navigation system determines whether the freeway segments F1 and F3 are on the same freeway. This is a procedure to determine whether the exited freeway and the reentered freeway are one and the same freeway, i.e, the freeway-ramp-freeway situation. As noted above, such a process of determining whether the two freeway segments are on the same freeway, the navigation system promotes or otherwise changes the map data levels as necessary for avoiding or minimizing the different mesh problem involved in such determinations.

If both of the freeway segments F1 and F3 are on the same freeway, the process moves to the step 116 wherein the navigation system examines the map data to retrieve freeway segments F (not the ramp R1 in the original route solution). Namely, the navigation system retrieves all of freeway segments (all-freeway link sequence) between the exit node N1 and the entry node N2 or within a predetermined distance D2 from the exit node N1. Such a predetermined distance D2 is preferably longer than the above noted distance D1, for example, up to 3.0 miles.

Figure 11E:
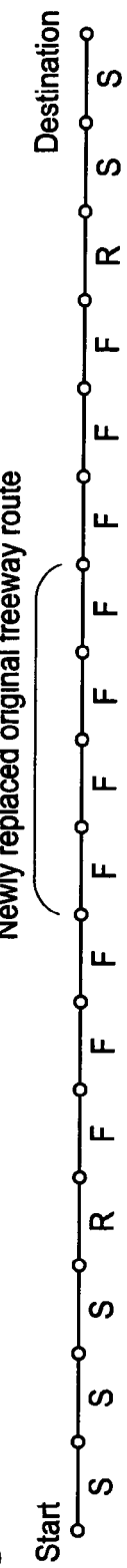

If an all-freeway link sequence (freeway segments connected with one another between the nodes N1 and N2) is not found, the process ends because the freeway is discontinuous. If the all-freeway link sequence is found as shown in FIG. 11D, i.e., all the freeway segments are connected between the exit node N1 and the entry node N2, the process moves to the step 117. In the step 117, the navigation system replaces the original route segments between the exit node N1 and the entry node N2 with the freeway segments F found in the step 116. Thus, as shown in FIG. 11E, the freeway-ramp-freeway situation is no longer included in the route to the destination.

Next, the situation where the dynamic route guidance (DRG) is used is described with reference to the flow chart of FIG. 12 and the schematic diagrams of FIG. 13A-13D. In this situation, even though the calculated route (route solution) is accepted by the user, the route will be changed dynamically in view of the current traffic conditions, etc. For example, detection of a traffic accident or traffic congestion can alter the cost associated with the originally calculated route, which prompts the recalculation of the route by the navigation system.

Figure 12:
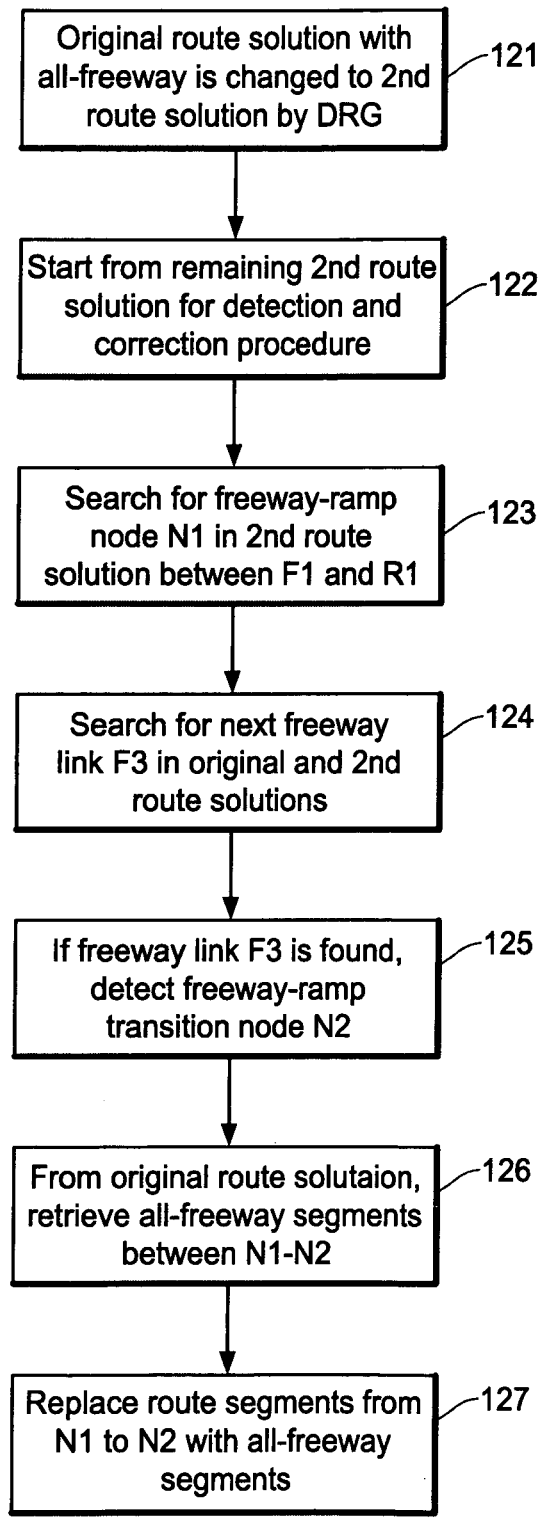
FIG. 12 is a flow chart showing an example of procedure for detecting the freeway-ramp-freeway situation in the calculated route and correcting the route in a DRG case under the present invention.
Figure 13A:
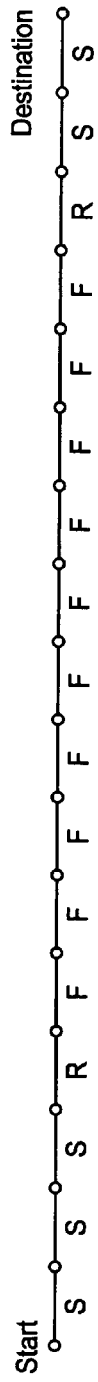
FIGS. 13A-13D are schematic diagrams showing an example of map image involved in the procedure corresponding to that of FIG. 12 for detecting the freeway-ramp-freeway situation in the calculated route and correcting the route in the DRG case under the present invention.
Figure 13B:
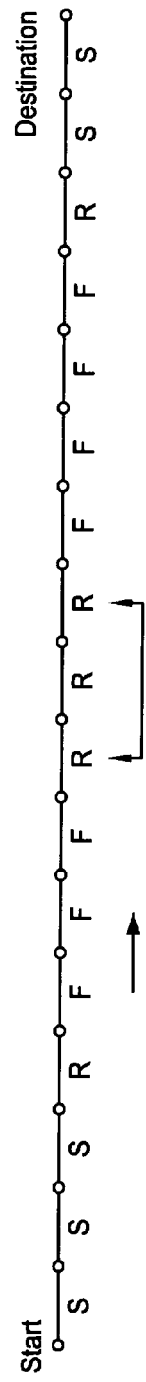

Thus, in this example, it is assumed that the navigation system originally establishes a calculated route to the destination which takes a freeway as shown in FIG. 13A. However, in the step 121 of FIG. 12, because of the significant change in the cost of the original route such as a traffic accident, the navigation system changes the route to exit the freeway for a short while and to enter the same freeway again as shown in FIG. 13B (second route). Suppose such a freeway-ramp-freeway situation violates the local traffic regulation, or imposes the driver hardship in driving, etc., it is necessary to avoid the freeway-ramp-freeway situation from the calculated route.

Thus, in the step 122, the navigation system starts traversing the second route from the remaining point of the route as shown in FIG. 13B for detection of the location of the freeway-ramp-freeway situation. In the next step 123, the navigation system searches a freeway-ramp transition node (exit node) N1 between a freeway segment F1 and a ramp segment R1. If the freeway-ramp transition node (exit node) N1 is found as shown in FIG. 13C, it means that the calculated route includes a condition where the route separates from the freeway.

Figure 13C:
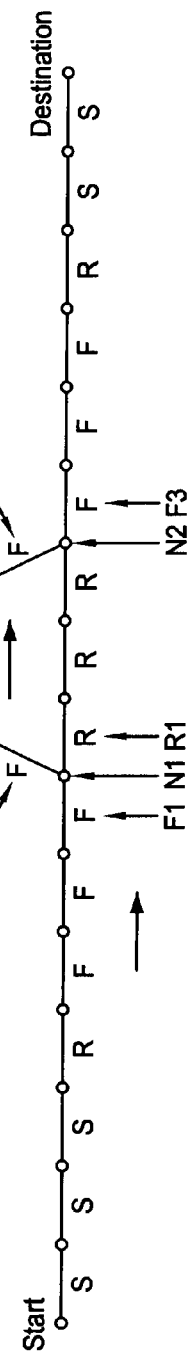

Here, the navigation system checks the original route solution or map data, and if the node N1 has a forward freeway segment F2 as shown in FIG. 13C, the process moves to the next step 124. However, if the node N1 does not have a forward freeway segment F2, it means that the freeway is discontinued because it is the end point of the freeway or other reason. Since there is no forward going freeway from the exit node N1, it is not possible to change the freeway-ramp-freeway segment to an all-freeway segment, thus, the process ends.

In the step 124, starting from the exit node N1, the navigation system searches the next freeway segments F on the originally calculated route (FIG. 13A) and the second route (FIG. 13B) for predetermined distances. The predetermined distance D1 for searching the next freeway segment F3 on the second route may be set arbitrary, for example, between 0.5 miles to 1.5 miles. The predetermined distance D2 for searching the next freeway segment F3 on the originally calculated route may be set arbitrary, for example, up to 3.0 miles. In the example of FIG. 13C, such a freeway segment F3 is found after traversing the three ramp segments R on the second route, which means that the second calculated route enters the freeway again.

If the freeway segment F3 is found in this manner, in the step 125, the navigation system detects a freeway-ramp transition node N2 that starts from the freeway segment F3. The freeway-ramp transition node N2 is an entry node of the second calculated route to the freeway. If the entry node N2 has an incoming freeway segment F4 as shown in FIG. 13C, then the navigation system proceeds to the next step 126. However, if the entry node N2 does not have an incoming freeway segment F4, it means that the freeway newly starts here or may be discontinuous. Since there is no incoming freeway segment to the entry node N2, it is not possible to change the freeway-ramp-freeway segment to an all-freeway segment, thus, the process ends.

Figure 13D:
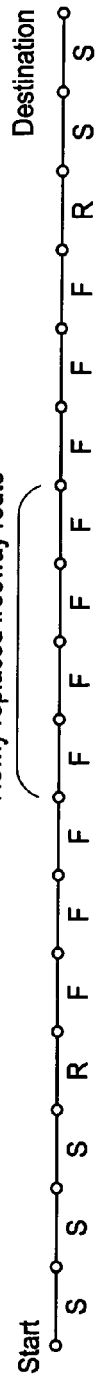

In the step 126, the navigation system retrieves from the originally calculated route all the freeway segments connected between the exit node N1 and the entry node N2. In the step 127, the navigation system replaces the route segments in the second calculated route between the exit node N1 and the entry node N2 in the second calculated route with the freeway segments F retrieved in the step 126. Thus, as shown in FIG. 13D, the freeway-ramp-freeway situation is no longer included in the final route to the destination.

As noted above, the navigation system has the ability to promote or otherwise change the map data levels as necessary when searching for the freeway-ramp-freeway condition. For example, in order to minimize the problem of different mesh problem, the navigation system promotes the map data level so that the chance of encountering the problem is minimized. The navigation system also has the ability to reject the calculated route that requires maneuvers of frequently taking off and on of the same freeway unless to do so is highly necessary for reducing the cost.

Figure 14:
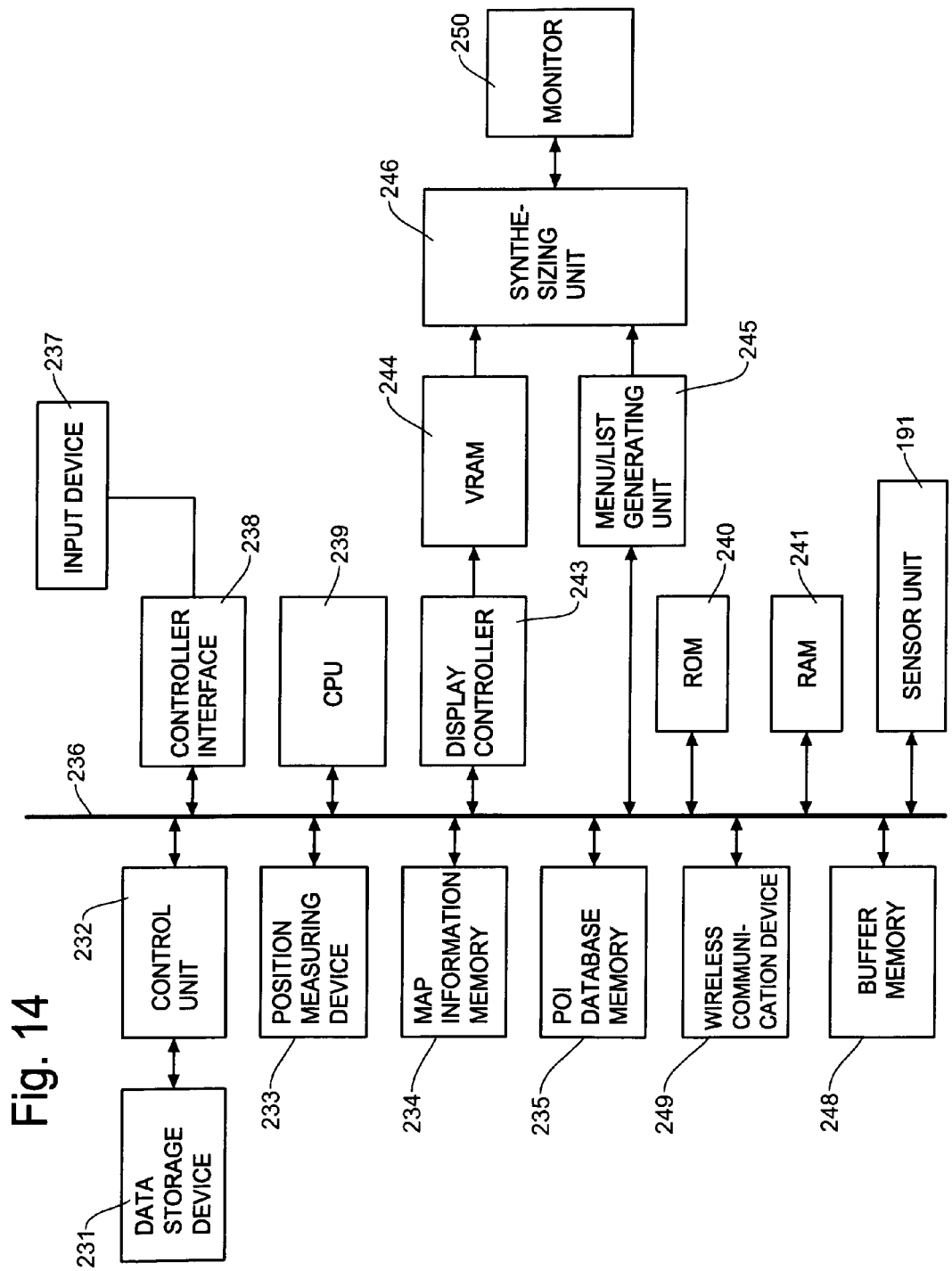
FIG. 14 is a functional block diagram showing an example of structure of a vehicle navigation system implementing the present invention for detecting the freeway-ramp-freeway situation and correcting the route to obtain the optimum route to the destination.

FIG. 14 is a functional block diagram showing an example of structure of a vehicle navigation system implementing the present invention for detecting the freeway-ramp-freeway situation and correcting the route to obtain the optimum route to the destination. While the vehicle navigation system is explained for an illustration purpose, the present invention can also be applied to other types of navigation system. For example, the present invention can be applied to a portable navigation device implemented as a PDA (personal digital assistant) device, a wireless telephone, a laptop computer, etc.

In the block diagram of FIG. 14, the navigation system includes a data storage device 231 such as a hard disc, CD-ROM, DVD, memory device or other storage means for storing the map data. The navigation system includes a control unit 232 for controlling an operation for reading the information from the data storage device 231, and a position measuring device 233 for measuring the present vehicle position. For example, the position measuring device 233 has a vehicle speed sensor for detecting a moving distance, a gyroscope for detecting a moving direction, a microprocessor for calculating a position, a GPS (global positioning system) receiver for processing GPS signals, and etc.

The block diagram of FIG. 14 further includes a map information memory 234 for storing the map information which is read from data storage device 231, a database memory 235 for storing database information such as point of interest (POI) information which is read out from the data storage device 231, an input device 237 for executing a menu selection operation, an enlarge/reduce operation, a destination input operation, etc. and a remote controller interface 238. The input device 237 can be a touch screen, a physical buttons, a remote controller, voice recognition input, or any other input device.

In FIG. 14, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, a synthesizing unit 246, a wireless communication device 249 for wireless communication to retrieve data from a remote server, a buffer memory 248 for temporally storing data for ease of data processing, and a monitor (display) 250.

Figure 4:
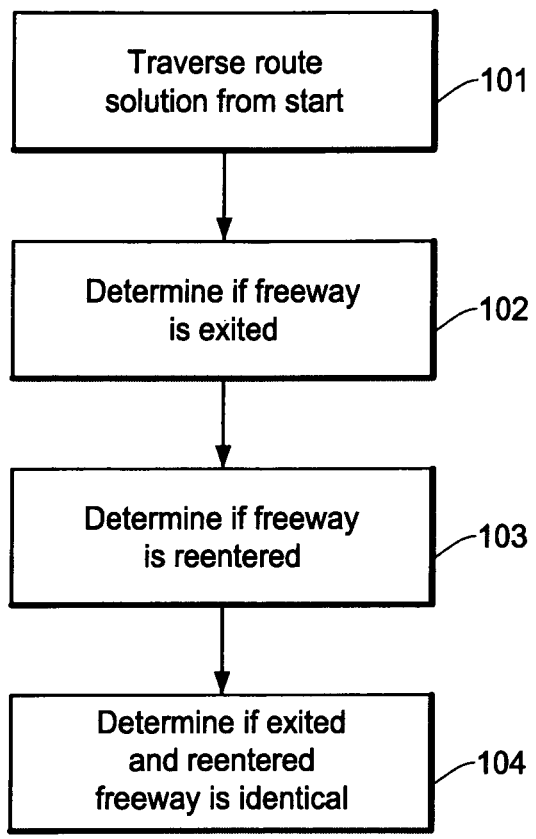
FIG. 4 is a flow chart showing a basic procedure of the present invention for detecting whether there is a freeway-ramp-freeway situation in the calculated route.

The procedures described with reference to the flow charts of FIGS. 4, 10 and 12 are performed under the control of the CPU 239 based on programs established in the ROM 40. The data storage device 231 stores the map data in the layered format as shown in FIG. 6. Alternatively, the data storage device 231 may store the map data in a different data format, such as XML, SVG, etc.

The wireless communication device 249 is used to receive and update the traffic information which can be used for the dynamic route guidance (DRG) as noted above. The RAM 241 or buffer memory 248 is used to store the map data concerning the routes such as the original calculated route and the second calculated route so that the calculated route can be reused later as necessary. For example, as described in the dynamic route guidance (DRG) case for route calculation, evaluation and correction with reference to FIG. 12 and FIGS. 13A-13D, the map data in the RAM 241 or the buffer memory 248 can be used.

As has been described above, according to the present invention, the method and apparatus enables a navigation system to detect and correct the freeway-ramp-freeway situation in the calculated route. The method and apparatus traverses the calculated route to detect whether there is a freeway-ramp-freeway situation in the calculated route by finding an exit node and an entry node on the calculated route for the same freeway. When the freeway-ramp-freeway situation exists, the method and apparatus checks availability of an all-freeway sequence and retrieves the freeway segments for the all-freeway sequence to replace them with the freeway-ramp-freeway situation. The present invention corrects the calculated route established either a normal route guidance mode or a dynamic route guidance mode. Accordingly, the present invention is able to remove the freeway-ramp-freeway situation that requires hardship in driving or violates the local traffic regulations from the calculated route.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A computer-implemented method of correcting a particular situation in a calculated route between a start point to a destination for a navigation system, the method comprising:

establishing, by a processor of the navigation system, the calculated route between the start point and the destination where the calculated route includes a freeway, wherein the start point is a current vehicle position measured by a position measuring device of the navigation system that includes a GPS (global positioning system) receiver;

examining, by the processor, the calculated route from one end to another end, in a forward direction, to detect whether there is a first point where the calculated route exits a freeway;

further examining, by the processor, the calculated route in the forward direction in order to detect whether there is a second point where the calculated route enters a freeway by shifting for a limited distance to find whether there is a ramp-to-freeway transition;

evaluating, by the processor, map data associated with the calculated route to determine whether the freeway exited at the first point and the freeway entered at the second point are the same freeway;

determining, by the processor, that a freeway-ramp-freeway situation exists in the calculated route when the freeway exited and the freeway entered are the same where the freeway-ramp-freeway situation is defined as a situation where the calculated route exits a freeway and immediately enters the same freeway;

retrieving, by the processor, one or more freeway segments between the first point and the second point by searching all-freeway segments without changing cost associated to the road segments;

replacing, by the processor, road segments of the calculated route between the first point and the second point constituting the freeway-ramp-freeway situation with the retrieved freeway segments between the first point and the second point, thereby changing the freeway-ramp-freeway situation to an all-freeway situation and creating a new route; and displaying, on a display screen of the navigation system, a map image including a map guide image and an arrow guide image of the new route while superimposing the current vehicle position measured by the position measuring device;

wherein said step of evaluating the map data to determine whether the freeway exited at the first point and the freeway entered at the second point are the same is conducted by comparing link IDs of the first point and the second point while taking map mesh IDs into consideration when the first point and the second point belong to different map meshes from one another in the map data retrieved from a data storage device.

2. A computer-implemented method of correcting a particular situation in a calculated route as defined in claim 1, after conducting said step of establishing the calculated route, the method further comprising a step of changing, by using the processor, the calculated route by dynamically evaluating a cost of the calculated route based on factors including current or estimated traffic conditions on the calculated route retrieved through a wireless communication device.

3. A computer-implemented method of correcting a particular situation in a calculated route as defined in claim 1, wherein the limited distance is a predetermined distance in a range of 0.5 miles to 1.5 miles.

4. A computer-implemented method of correcting a particular situation in a calculated route as defined in claim 1, wherein said step of evaluating the map data to determine whether the freeway exited at the first point and the freeway entered at the second point are the same is conducted by comparing link IDs of the first point and the second point at the same or higher map layer level when the first point and the second point belong to different map meshes from one another in the map data retrieved from the data storage device.

5. A computer-implemented method of correcting a particular situation in a calculated route as defined in claim 1, before conducting said step of replacing the road segments of the calculated route, the method further comprising a step of comparing, by using the processor, a first cost associated with the freeway-ramp-freeway situation with a second cost associated with the all-freeway situation and proceeding to said step of replacing the road segments unless the second cost is higher than the first cost by a predetermined degree where the cost is determined based on factors including a distance and a time length.

6. A computer-implemented method of correcting a particular situation in a calculated route as defined in claim 1, before conducting said step of replacing the road segments of the calculated route, the method further comprising a step of examining, by using the processor, a traffic regulation governing a location of the freeway-ramp-freeway situation and immediately proceeding to said step of replacing the road segments when the traffic regulation retrieved from a data storage device or through a wireless communication device prohibits the freeway-ramp-freeway situation.

7. A computer-implemented method of correcting a particular situation in a calculated route as defined in claim 1, after conducting said step of determining that the freeway-ramp-freeway situation exists, the method further comprising a step of evaluating, by using the processor, the map data retrieved from a data storage device to find a freeway segment that is connected to the first point and is oriented in the forward direction.

8. A computer-implemented method of correcting a particular situation in a calculated route as defined in claim 7, after conducting said step of finding the freeway segment that is connected to the first point, the method further comprising, by using the processor, a step of evaluating the map data to find a freeway segment on the calculated route within a predetermined distance from the first point, and a step of evaluating, by using the processor, the map data to find a freeway segment that is incoming to the second point.

9. A computer-implemented method of correcting a particular situation in a calculated route as defined in claim 8, after conducting said step of finding the freeway segment that is incoming to the second point, the method further comprising a step of retrieving, by using the processor, all of freeway segments between the first point and the second point so that the retrieved freeway segments replace the road segments constituting the freeway-ramp-freeway situation.

10. An apparatus for correcting a particular situation in a calculated route between a start point to a destination for a navigation system, comprising:

a data storage device which stores map data related to operations of the navigation system;

a position measuring device that includes a GPS (global position system) receiver;

a display screen which displays information and images related to the operations of the navigation system including selection of a start point and a destination, and route guidance to the destination; and a processor controlling overall operations of the navigation system including retrieving the map data from the data storage device, selecting and correcting the calculated route between the start point and the destination, and guiding a user to the destination;

wherein the processor controls the following operations of:

establishing the calculated route between the start point and the destination where the calculated route includes a freeway, wherein the start point is a current vehicle position measured by the position measuring device that includes the GPS receiver;

examining the calculated route from one end to another end, in a forward direction, to detect whether there is a first point where the calculated route exits a freeway;

further examining the calculated route in the forward direction in order to detect whether there is a second point where the calculated route enters a freeway by shifting for a limited distance to find whether there is a ramp-to-freeway transition;

evaluating map data associated with the calculated route to determine whether the freeway exited at the first point and the freeway entered at the second point are the same freeway;

determining a freeway-ramp-freeway situation exists in the calculated route when the freeway exited and the freeway entered are the same where the freeway-ramp-freeway situation is defined as a situation where the calculated route exits a freeway and immediately enters the same freeway;

retrieving one or more freeway segments between the first point and the second point by searching all-freeway segments without changing cost associated to the road segments;

replacing road segments of the calculated route between the first point and the second point constituting the freeway-ramp-freeway situation with freeway segments between the first point and the second point, thereby changing the freeway-ramp-freeway situation to an all-freeway situation and creating a new route; and displaying, on the display screen, a map image including a map guide image and an arrow guide image of the new route while superimposing the current vehicle position measured by the position measuring device; and wherein the operation of evaluating the map data to determine whether the freeway exited at the first point and the freeway entered at the second point are the same is conducted by the processor by comparing link IDs of the first point and the second point while taking map mesh IDs into consideration when the first point and the second point belong to different map meshes from one another in the map data.

11. An apparatus for correcting a particular situation in a calculated route as defined in claim 10, after conducting the operation of establishing the calculated route, the processor further controls an operation of changing the calculated route by dynamically evaluating a cost of the calculated route based on factors including current or estimated traffic conditions on the calculated route retrieved through a wireless communication device.

12. An apparatus for correcting a particular situation in a calculated route as defined in claim 10, wherein the limited distance is a predetermined distance in a range of 0.5 miles to 1.5 miles.

13. An apparatus for correcting a particular situation in a calculated route as defined in claim 10, wherein the operation of evaluating the map data to determine whether the freeway exited at the first point and the freeway entered at the second point are the same is conducted by the processor by comparing link IDs of the first point and the second point at the same or higher map layer level when the first point and the second point belong to different map meshes from one another in the map data.

14. An apparatus for correcting a particular situation in a calculated route as defined in claim 10, before conducting the operation of replacing the road segments of the calculated route, the processor further controls an operation of comparing a first cost associated with the freeway-ramp-freeway situation with a second cost associated with the all-freeway situation and proceeding the operation of replacing the road segments unless the second cost is higher than the first cost by a predetermined degree where the cost is determined based on factors including a distance and a time length.

15. An apparatus for correcting a particular situation in a calculated route as defined in claim 10, before conducting the operation of replacing the road segments of the calculated route, the processor further controls an operation of examining a traffic regulation governing a location of the freeway-ramp-freeway situation and immediately replacing the road segments when the traffic regulation prohibits the freeway-ramp-freeway situation.

16. An apparatus for correcting a particular situation in a calculated route as defined in claim 10, after conducting the operation of determining that the freeway-ramp-freeway situation exists, the processor further controls an operation of evaluating the map data to find a freeway segment that is connected to the first point and is oriented in the forward direction.

17. An apparatus for correcting a particular situation in a calculated route as defined in claim 16, after conducting the operation of finding the freeway segment that is connected to the first point, the processor further controls operations of evaluating the map data to find a freeway segment on the calculated route within a predetermined distance from the first point, and evaluating the map data to find a freeway segment that is incoming to the second point.

18. An apparatus for correcting a particular situation in a calculated route as defined in claim 17, after conducting the operation of finding the freeway segment that is incoming to the second point, the processor further controls an operation of retrieving all of freeway segments between the first point and the second point so that the retrieved freeway segments replace the road segments constituting the freeway-ramp-freeway situation.

* * * * *